(12) United States Patent
Wong et al.

(10) Patent No.: US 9,563,353 B2
(45) Date of Patent: *Feb. 7, 2017

(54) GESTURE DETECTION ZONES

(71) Applicant: HEWLETT-PACKARD DEVELOPMENT COMPANY, L.P., Houston, TX (US)

(72) Inventors: Glenn A. Wong, Redwood City, CA (US); Mark C. Solomon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/540,646

(22) Filed: Nov. 13, 2014

(65) Prior Publication Data
US 2015/0062053 A1    Mar. 5, 2015

Related U.S. Application Data

(63) Continuation of application No. 13/140,831, filed as application No. PCT/US2008/088455 on Dec. 29, 2008, now Pat. No. 8,928,604.

(51) Int. Cl.
*G06F 3/041* (2006.01)
*G06F 3/0488* (2013.01)
*G06F 3/01* (2006.01)

(52) U.S. Cl.
CPC .......... *G06F 3/04883* (2013.01); *G06F 3/017* (2013.01)

(58) Field of Classification Search
None
See application file for complete search history.

(56) References Cited

U.S. PATENT DOCUMENTS

| 6,570,557 B1 | 5/2003 | Westerman et al. |
| 7,030,861 B1 | 4/2006 | Westerman et al. |

(Continued)

FOREIGN PATENT DOCUMENTS

| CN | 101052939 A | 10/2007 |
| JP | 2001-134382 A | 5/2001 |

(Continued)

OTHER PUBLICATIONS

HPDC, Extended Search Report dated Apr. 16, 2013, EP App. No. 08879308.8, 8 p.

(Continued)

*Primary Examiner* — Joseph Haley
(74) *Attorney, Agent, or Firm* — Conley Rose

(57) ABSTRACT

A system and method for utilizing a gesture-based user interface. A system includes an operator input device and a processor. The operator input device detects gestures and multiple simultaneous touch points. An input area of the operator input device includes a plurality of gesture detection zones. The processor is coupled to the operator input device. The processor executes a gesture recognition software program that processes inputs from the input device. The gesture recognition program causes the processor to recognize a primary gesture and a simultaneous secondary gesture, and to perform a processing function based, at least in part, on the primary gesture and a gesture detection zone in which the secondary gesture is detected.

18 Claims, 2 Drawing Sheets

(56) References Cited

U.S. PATENT DOCUMENTS

| | | | |
|---|---|---|---|
| 7,055,110 B2 | 5/2006 | Kupka | |
| 2006/0026521 A1 | 2/2006 | Hotelling et al. | |
| 2006/0209014 A1 | 9/2006 | Duncan et al. | |
| 2007/0268268 A1 | 11/2007 | Allison | |
| 2008/0036743 A1 | 2/2008 | Westerman et al. | |
| 2008/0165255 A1 | 7/2008 | Christie et al. | |
| 2008/0316183 A1* | 12/2008 | Westerman | G06F 3/0416 345/173 |
| 2009/0106682 A1* | 4/2009 | Abdelhadi | G06F 3/023 715/771 |
| 2009/0289904 A1 | 11/2009 | Park et al. | |

FOREIGN PATENT DOCUMENTS

| | | |
|---|---|---|
| JP | 2007-500400 A | 1/2007 |
| JP | 2007-240964 A | 9/2007 |
| JP | 2008-508601 A | 3/2008 |
| JP | 2009-525538 A | 7/2009 |

OTHER PUBLICATIONS

HPDC, Final Office Action dated Aug. 19, 2013, U.S. Appl. No. 13/140,831, 11 p.
HPDC, Final Office Action dated Jun. 24, 2014, U.S. Appl. No. 13/140,831, 6 p.
HPDC, International Search Report and Written Opinion dated Sep. 30, 2009, PCT App. No. PCT/US2008/088455, 12 p.
HPDC, Notice of Allowance and Fee(s) Due dated Aug. 29, 2014, U.S. Appl. No. 13/140,831, 6 p.
HPDC, Office Action dated Feb. 3, 2014, U.S. Appl. No. 13/140,831, 10 p.
HPDC, Office Action dated Mar. 22, 2013, U.S. Appl. No. 13/140,831, 12 p.

* cited by examiner

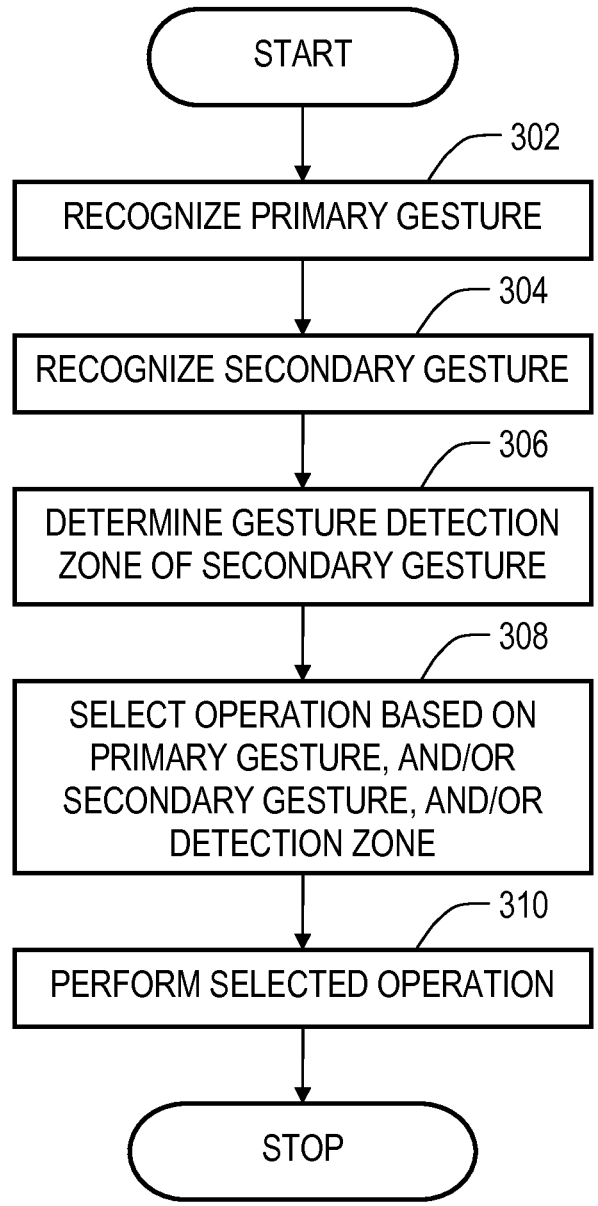

GESTURE DETECTION ZONES

CROSS-REFERENCE TO RELATED APPLICATIONS

This application is a continuation of U.S. patent application Ser. No. 13/140,831, filed Jun. 18, 2011, titled "Gesture Detection Zone," which is the U.S. National Stage under 35 U.S.C. §371 of International Patent Application No. PCT/US2008/088455, filed Dec. 29, 2008, which are hereby incorporated herein by reference in their entirety for all purposes.

BACKGROUND

Over the years, user interface systems of various types have been developed to facilitate control of computers and other electronic devices. Simple switches and knobs suffice to provide operator input information to some electronic devices. Computer systems, on the other hand, have generally employed more flexible data and control input means. Keyboard entry prevails in the command line environment, and the flexibility of keyboard entry dictates that some form of keyboard entry, for example, hard or soft keyboard entry, is likely to continue for the foreseeable future.

Use of pointing devices increased with the rise of graphical user interfaces. The mouse, trackball, touchpad, joystick, etc. are commonly used to direct the movement of a cursor on the display screen of a graphical user interface.

Touch screen technologies allow the surface or near surface of a display to serve as a user interface device. The touch screen detects user input in the form of screen touches, or near screen touches when using some touch screen technologies. Touch screens are advantageous in that no dedicated input device, apart from the touch detection apparatus coupled to the display, is required. A variety of touch screen technologies are available, including resistive, capacitive, infra-red, surface acoustic wave, and video each with its advantages and disadvantages.

Touch screen systems enabling recognition of multiple touch points have become increasingly popular. These systems, allow the use of gestures (e.g., hand or finger motion) and/or chording (e.g., the simultaneous use of multiple finger or hand touch points) to extend and simplify touch screen operations. However, like a large vocabulary of commands in a command line system, an extensive set of gestures may be difficult for a user to remember. Moreover, many conceivable gestures may entail unnatural movements.

BRIEF DESCRIPTION OF THE DRAWINGS

For a detailed description of exemplary embodiments of the invention, reference will now be made to the accompanying drawings in which:

FIG. 3 shows a flow diagram for a method for implementing gesture detection zones in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In systems utilizing gesture based input devices, for example, a touchscreen capable of detecting gestures and/or multiple touch points, increasingly large sets of gestures have been developed to enable selection of system operations. Unfortunately, large sets of gestures can result in at least some of the gestures requiring unnatural movements or a gesture being composed of multiple sequential gestures. Embodiments of the present disclosure include a novel gesture-based input mode that can employ a single primary gesture to select one of a plurality of processing functions. Thus, embodiments advantageously avoid the need for unnatural or sequentially composed gestures.

Figure 1:
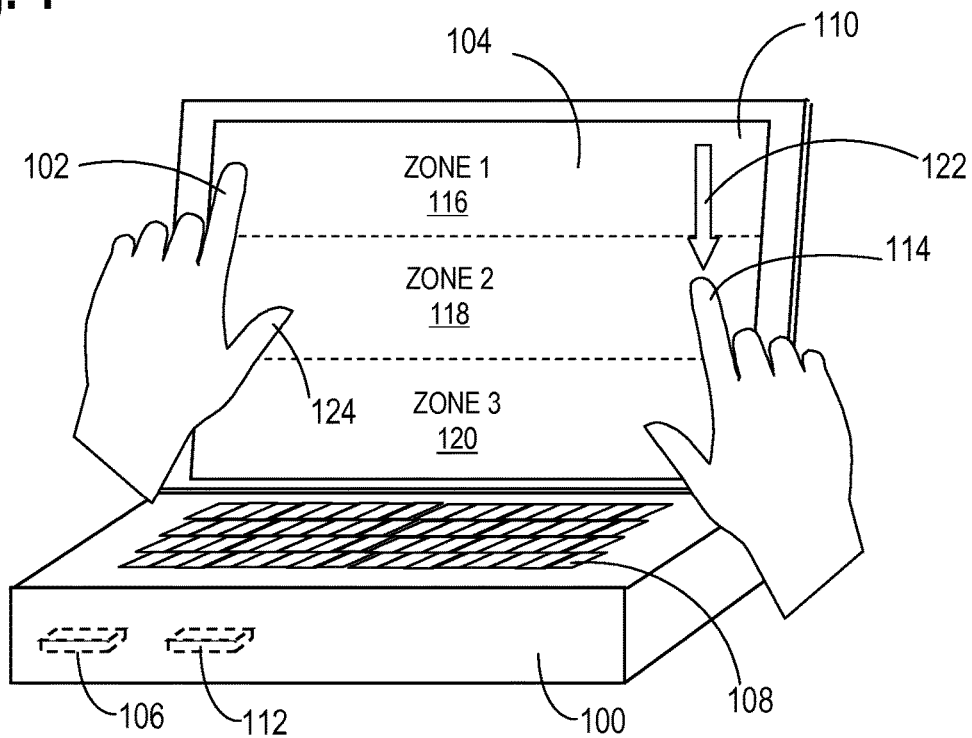
FIG. 1 shows a system that includes gesture detection zones in accordance with various embodiments.

FIG. 1 shows a system 100 that includes gesture detection zones for use with simultaneous primary and secondary gestures in accordance with various embodiments. The system 100 includes a visual display 110, a touch and/or gesture input device 104, a processor 106, and data/program storage 112. Some embodiments of the system 100 can include other input devices, such as a keyboard 108, a mouse, etc. Embodiments can also include various input/output sub-systems to implement, for example, wired and/or wireless networking. In FIG. 1, the system 100 is depicted as a notebook computer, however in practice the system 100 can be any of a variety of electronic devices. For example, the system 100 can be a touchscreen or gesture-based telephone, personal digital assistant, music player, desktop computer, satellite navigation system, gaming system or other gesture input enabled device.

The visual display 110 provides information to a user of the system 100, and can be, for example, a liquid crystal display ("LCD"), organic light emitting diode ("OLED") display or any other display technology useable with touch and/or gesture based input technology.

The touch and/or gesture based input device 104 provides operator inputs to the system 100 by detecting operator contact with the device 104, or gestures in the proximity of the device 104, and generating electrical signals representative of the detected contact and/or gestures. The input device 104 can be implemented in any of a variety of technologies, for example, a resistive, capacitive, surface acoustic wave, infra-red, or optical system can overlay the visual display 110. In some embodiments, a video system can be used to detect user gestures. Embodiments of the system 100 encompass all input devices that detect user contact and/or gestures and convert detected contact and/or gestures to electrical signals.

Embodiments of the present disclosure provide the capability to assign multiple functions to a gesture. For descriptive purposes, the terms "primary gesture" and "secondary gesture" are used herein. A primary gesture and a secondary gesture can be used in combination to select a processing operation. In some embodiments, a secondary gesture is performed in conjunction with and concurrently with a primary gesture to select an operation to be performed. Primary and secondary gestures may be natural and easy for a user to execute. A primary gesture may be a first gesture executed to select a set of operations. A secondary gesture performed in concert with the primary gesture may select an element of the set of operations to be performed. In at least some embodiments, secondary gestures may be recognized only when performed in predetermined areas of the input device 104. For example, an embodiment may recognize secondary gestures on the left hand side of the input device 104.

In FIG. 1, the gesture/touch detection area of the input device 104 is divided into a plurality of gesture detection zones 116, 118, 120. The gesture detection zones 116-120 can be discrete areas of the input device 104. In some embodiments, a processing operation performed in response to a primary and secondary gesture is determined, at least in part, by the detection zone 116-120 in which the secondary gesture is performed. In at least some embodiments, the secondary gesture is initiated prior to or concomitant with the primary gesture and sustained throughout the performance of a primary gesture. For example, if a primary gesture is a downward swipe 122 of the input device 104 with a user's finger 114 (note that any gesturing implement can be used), a secondary gesture may be a touch of the input device 104 with a second finger 102 in a selected detection zone 116-120. The secondary gesture, illustrated here as contact between finger 102 and zone 1 116 of input device 104, may be initiated prior to, or at least simultaneously with, the initiation of the primary gesture. Moreover, the secondary gesture may be sustained, in some embodiments, for the duration of the primary gesture. If, for example, a user touches zone 1 116 while contemporaneously executing downward swipe 122, the selected operation may be, for example, selection of text lines traversed by swipe 122.

If, on the other hand, a user touches zone 2 118 while contemporaneously executing downward swipe 122, a different operation may be performed. For example, lines of text traversed by swipe 122 may be deleted from a displayed document. As a further example, if a user touches zone 3 120 while contemporaneously executing downward swipe 122, a third operation may be performed. For example, the lines of text traversed by swipe 122 may be copied to a storage buffer. Thus, by combining a primary gesture with a secondary gesture and gesture detection zones, embodiments of the present disclosure allow use of a single primary gesture to perform a plurality of operations. In some embodiments, the number of different processing functions corresponding to a primary gesture is at least as great as the number of gesture detection zones.

Some embodiments allow simultaneous secondary gestures in multiple gesture detection zones. For example, as shown in FIG. 1, finger 102 may touch zone 1 116 while thumb 124 touches zone 2 118. The two simultaneous secondary gestures in different gesture detection zones 116, 118 performed contemporaneously with the primary gesture 122, may cause a different operation to be performed than does the primary gesture 122 in concert with a single secondary gesture in either zone 1 116 or zone 2 118.

Embodiments further increase the number of operations performable using a primary gesture by selecting an operation based on the secondary gesture performed. For example, if as described above, in conjunction with a primary gesture 122, a secondary gesture is a single point of touch in detection zone 1 116, a first operation is performed. If, however, a secondary gesture is multiple points of touch within a predetermined proximity to one another in detection zone 1 116, in conjunction with the primary gesture 122, a different operation may be performed.

While embodiments have been described in terms of specific primary gestures, specific secondary gestures, and a specified number of gesture detection zones, embodiments are not limited to any particular number of gesture detection zones or types of gestures. Moreover, while detection of a secondary gesture in a particular gesture detection zone 116-120 can be a factor in determining which processing operation is selected, at least some embodiments allow a primary gesture to be performed in any gesture detection zone 116-120.

The processor 106 of system 100 can be a general-purpose microprocessor, microcontroller, digital signal processor, etc. configured to execute software programs. The components of a processor are well known in that art and generally include execution units (e.g., integer, fixed point, floating point, etc.), instruction decoding, registers, memories, input/output ports, etc, interconnected by buses.

Data/program storage 112 is a computer readable medium and is coupled to the processor 106. Data/program storage 112 can include various storage media, for example, magnetic storage (e.g., hard disks, floppy disks, tape, etc.), optical storage (e.g., compact disk, digital video disk, etc.), or semiconductor memory (e.g., static or dynamic random-access-memory ("SRAM" or "DRAM"), read-only-memory ("ROM"), FLASH memory, magnetic random access memory ("MRAM"), etc.).

The system 100 includes software programming stored in storage 112 that when executed by the processor 106 provides recognition of primary and secondary gestures, creation of gesture detection zones on the input device 104, and determination of a gesture detection zone in which a gesture is performed. Embodiments provide gesture detection zones and/or primary gesture recognition and/or secondary gesture recognition applicable to single or multiple applications. Thus, embodiments advantageously provide a means of using natural gestures to perform multiple functions.

Figure 2:
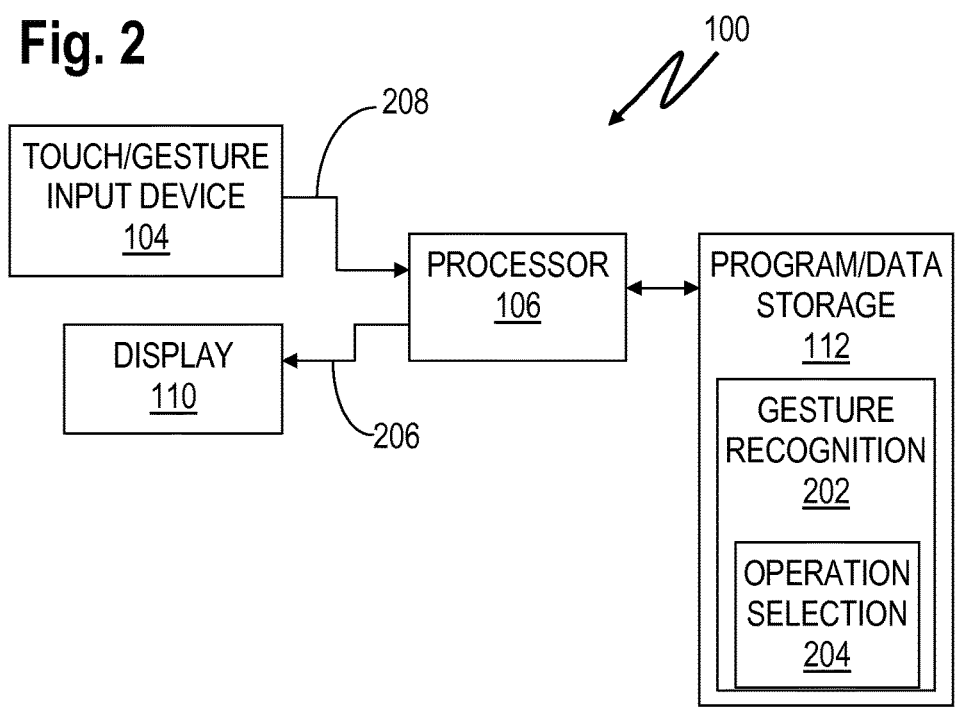
FIG. 2 shows a block diagram of a system including gesture detection zones in accordance with various embodiments.

FIG. 2 shows a block diagram of the system 100 including gesture detection zones for use with primary and secondary gestures in accordance with various embodiments. As explained above, the display 110 provides visual output to the system user. The display 110 is coupled to the processor 106. The processor 106 provides video data 206 that is presented to the user in visual form on display 110. Video data 206 can include textual data, graphical data, etc.

The touch/gesture input device 104 detects user contacts and/or gestures and provides electrical signals 208 representative of the contacts and/or gestures to the processor 106. The signals 208 represent contact/gestures identifying operations that the user wishes to perform. In embodiments of the present disclosure, signals 208 are representative of primary and/or secondary gestures indicating that the user wishes to initiate a processing operation. The signals 208 also indicate the location at which a gesture is performed to facilitate identification of the gesture detection zone 116-120 in which a secondary gesture is performed. For example, the signals 208 may include an input device 104 coordinate where a secondary gesture contact was detected. Processor 106 and associated software programming can correlate the coordinate with the gesture detection zones 116-120.

Processor 106 executes software programming stored in program/data storage 112. Programming stored in storage 112 includes gesture recognition program 202 and operation selection program 204. The gesture recognition program 202 processes the signals 208 to determine the primary and/or secondary gestures represented and the locations on the input device 104 where the gestures were performed. When particular primary and/or secondary gestures has been identified, and the gesture detection zone(s) in which a secondary gesture was performed have been resolved, operation selection software 204 causes the processor 106 to perform a processing operation based on the detected primary gesture and/or secondary gesture and/or gesture detection zone(s).

Some embodiments of the system 100 include gesture recognition programming 202, and operation selection programming 204 that perform the operations described below with regard to the flow diagram of FIG. 3.

FIG. 3 shows a flow diagram for a method for performing processing operations based on a primary gesture, a secondary gesture, and a gesture detection zone in accordance with various embodiments. Though depicted sequentially as a matter of convenience, at least some of the actions shown can be performed in a different order and/or performed in parallel. Additionally, some embodiments may perform only some of the actions shown.

In block 302, the touch/gesture input device 104 detects a primary user contact or gesture. The contact or gesture is converted to electrical signals 208, and the electrical signals are provided to the processor 106. The processor 106 executes instructions of the gesture recognition program 202 to determine, based on the signals 208, a primary gesture performed by the user. Embodiments are not limited to any particular set of chords or gestures recognized as primary gestures. Furthermore, embodiments do not limit recognition of primary gestures to any particular areas of the input device 104.

In block 304, the touch/gesture input device 104 detects a secondary user contact or gesture. The contact or gesture is converted to electrical signals 208, and the electrical signals are provided to the processor 106. The processor 106 executes instructions of the gesture recognition program 202 to determine, based on the signals 208, a secondary gesture performed by the user. Embodiments are not limited to any particular set of chords or gestures recognized as secondary gestures. In some embodiments, signals 208 representative of a secondary gesture are present concurrently with signals representative of a primary gesture.

In block 306, the processor 106, executing the gesture recognition program 202 has divided at least a portion of the gesture detection area of the input device 104 into a plurality of gesture detection zones 116-120. Using information included in the electrical signals 208 (e.g., contact coordinates), the processor 106 determines the gesture detection zone(s) 116-120 in which the secondary gesture was performed.

In block 308, the processor 106 executing the operation selection program 204 selects a processing operation to perform based on the recognized primary gesture and at least one of the recognized secondary gesture and the gesture detection zone(s) in which the secondary gesture was performed. The processor 106 performs the selected processing operation in block 310.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising: an operator input device that detects gestures and multiple simultaneous touch points; and a processor coupled to the operator input device, the processor to: divide an input area of the operator input device into a plurality of gesture detection zones; recognize a primary gesture and a simultaneous secondary gesture detected via the operator input device; identify the secondary gesture as a plurality of simultaneous gestures in different ones of the gesture detection zones; select, based on the primary gesture, a set of processing functions corresponding to the primary gesture, the set of processing functions comprising a plurality of different processing functions; and select, based at least in part on a number of the plurality of simultaneous gestures detected, a processing function to be performed from the set of processing functions; and select, based at least in part on a number of the simultaneous gestures detected, the processing function to be performed from the set of processing functions.

2. The system of claim 1, wherein the processor is to:
identify one of the gesture detection zones in which the secondary gesture is performed; and
select, based at least in part, on the one of the gesture detection zones, the processing function to be performed.

3. The system of claim 1, wherein each gesture detection zone defines a discrete area for detection of the secondary gesture, and location of each of the plurality of gesture detection zones is independent of both the primary gesture and the secondary gesture.

4. The system of claim 1, wherein the secondary gesture comprises a point of contact with the input device established prior to and maintained throughout the primary gesture.

5. The system of claim 1, wherein a detection zone comprises a horizontal band of input detection area.

6. The system of claim 1, wherein the primary gesture is performable in each and any of the detection zones.

7. The system of claim 1, wherein the plurality of different processing functions comprises a number of functions corresponding to at least a total number of gesture detection zones times a number of secondary gestures recognizable per detection zone.

8. The system of claim 1, wherein the processor is to:
detect the secondary gesture as a plurality of simultaneous touch points in a single one of the gesture detection zones; and
select, based, at least in part, on a number of the touch points simultaneously detected, the processing function to be performed.

9. The system of claim 1, wherein the primary gesture comprises a swipe of the operator input device.

10. A method, comprising:
    detecting a primary gesture via an operator input device coupled to a processor, the primary gesture comprising a swipe on the operator input device;
    detecting, contemporaneously with the primary gesture, a secondary gesture via the operator input device;
    independent of both the primary gesture and the secondary gesture, determining location of a plurality of gesture detection zones of the operator input device, each of the gesture detection zones of the plurality extending from edge to edge of the operator input device;
    selecting, based on the primary gesture, a set of processing functions corresponding to the primary gesture, the set of processing functions comprising a plurality of different processing functions;
    selecting, based on the secondary gesture, a processing function to be performed from the set of processing functions; and
    performing the selected processing function via the processor.

11. The method of claim 10, further comprising:
    identifying one of the gesture detection zones in which the secondary gesture is performed; and
    selecting, based at least in part, on the one of the gesture detection zones, the processing function to be performed.

12. The method of claim 10, further comprising recognizing the secondary gesture only if performed in a predetermined area of the input device encompassing a subportion of each of the gesture detection zones, wherein the predetermined area is defined prior to detecting the primary and secondary gestures.

13. The method of claim 10, further comprising:
    identifying the secondary gesture as a plurality of simultaneous gestures, each of the plurality of simultaneous gestures detected in different ones of the gesture detection zones; and
    selecting, based, at least in part, on a number of the simultaneous gestures detected, the processing function to be performed.

14. The method of claim 10, further comprising:
    detecting the secondary gesture as a plurality of simultaneous touch points in a single one of the gesture detection zones; and
    selecting, based, at least in part, on a number of the touch points simultaneously detected, the processing function to be performed.

15. A non-transitory computer readable medium encoded with instructions that when executed cause a processor to:
    divide a detection area of a gesture input device into a plurality of gesture detection zones;
    recognize a primary gesture and a secondary gesture performed concurrently with the primary gesture on the gesture input device;
    detect the second gesture as a plurality of simultaneous touch points in a single one of the gesture detection zones;
    select, based on the primary gesture, a set of processing functions corresponding to the primary gesture, the set of processing functions comprising a plurality of different processing functions;
    identify one of the gesture detection zones in which the secondary gesture is performed;
    select, based on the secondary gesture, the one of the gesture detection zones in which the secondary gesture is performed, and a number of the touch points simultaneously detected, a processing function to be performed from the set of processing functions;
    wherein location of each of the plurality of gesture detection zones is independent of both the primary gesture and the secondary gesture.

16. The computer readable medium of claim 15, further comprising instructions that when executed cause the processor to:
    identify the secondary gesture as a plurality of simultaneous gestures, each of the gestures detected in different ones of the gesture detection zones; and
    select, based, at least in part, on a number of the simultaneous gestures detected, the processing function to be performed.

17. The computer readable medium of claim 15, further comprising instructions that when executed cause the processor to recognize a swipe as the primary gesture.

18. A system, comprising:
    an operator input device that detects gestures and multiple simultaneous touch points; and
    a processor coupled to the operator input device, the processor to:
        divide an input area of the operator input device into a plurality of gesture detection zones, each gesture detection zone of the plurality extending edge to edge of the operator input device;
        recognize a primary gesture and a simultaneous secondary gesture detected via the operator input device;
        select, based on the primary gesture, a set of processing functions corresponding to the primary gesture, the set of processing functions comprising a plurality of different processing functions; and
        select, based on the secondary gesture, a processing function to be performed from the set of processing functions.

* * * * *